United States Patent Office 2,841,485
Patented July 1, 1958

2,841,485
HEXAHALOBICYCLOHEPTENEDIOLS AND DERIVATIVES THEREOF

William K. Johnson, Dayton, Ohio, and Tad Le Marre Patton, Houston, Tex., assignors to Monsanto Chemical Company, St. Louis, Mo., a corporation of Delaware No Drawing. Application May 20, 1955
Serial No. 510,053

26 Claims. (Cl. 71—2.3)

This invention relates to hexahalobicycloheptenediols and derivatives thereof, to methods of making the same, and to the use of these compounds as biological toxicants.

The present invention provides new and useful compounds of the general formula.

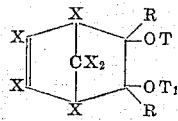

where X is a halogen having an atomic weight of below 100, R is selected from the class consisting of hydrogen and hydrocarbon radicals of from 1 to 6 carbon atoms, T and $T_1$ taken separately are selected from the class consisting of hydrogen, hydrocarboncarbonyl radicals, and hydrocarboncarbamyl radicals wherein the hydrocarbon portion of the said hydrocarbon-substituted radicals is a hydrocarbon radical containing from 1 to 18 carbon atoms and from 0 to 2 carbocyclic rings containing up to 6 carbon atoms per ring, and T and $T_1$ taken together represent the bivalent di-substituted carbon atom-containing radical

where Q taken separately is a hydrocarbon radical free of aliphatic unsaturation and containing up to 6 carbon atoms, Q' taken separately is selected from the class consisting of hydrogen and Q, and Q and Q' taken together represent a chain of up to 5 carbon atoms, the terminal carbon atoms of which are singly bonded to the carbon atom to which Q and Q' are attached wherein the carbon atoms of the said chain of carbon atoms are attached to substituents selected from the class consisting of hydrogen, chlorine and lower alkyl radicals.

The compounds provided by this invention are the 1,4,5,6,7,7 - hexahalobicyclo[2.2.1] - 5 - heptene - 2,3-diols, the carboxylic and carbamic acid esters of these diols, and the acetals of these diols. The preparation of the present compounds is hereinafter described. The new compounds provided by this invention are useful for a variety of purposes, and are particularly effective as biological toxicants.

The diols of the present invention are prepared from 1,4,5,6,7,7 - hexahalobicyclo[2.2.1] - 5 - heptene - 2,3-diol cyclic carbonates, which latter may be synthesized by the reaction of hexahalocyclopentadienes and vinylene carbonates, as disclosed in our copending application filed of even date herewith as Serial Number 510,052, now Patent No. 2,799,567, which application is assigned to the same assignee as the present case. As examples of suitable cyclic carbonates may be mentioned, e. g.

1,4,5,6,7,7 - hexachlorobicyclo[2.2.1] - 5 - heptene - 2,3-diol cyclic carbonate, 1,4,5,6,7,7 - hexachloro - 2 - methylbicyclo[2.2.1] - 5-heptene-2,3-diol cyclic carbonate, 1,4,5,6,7,7 - hexachloro - 2 - ethylbicyclo[2.2.1] - 5-heptene-2,3-diol cyclic carbonate, 1,4,5,6,7,7 - hexachloro - 2 - phenylbicyclo[2.2.1] - 5-heptene-2,3-diol cyclic carbonate, 1,4,5,6,7,7 - hexachloro - 2,3 - dimethylbicyclo[2.2.1] - 5-heptene-2,3-diol cyclic carbonate, 1,4,5,6,7,7 - hexachloro - 2 - methyl - 3 - phenylbicyclo[2.2.1]-5-heptene-2,3-diol cyclic carbonate, 1,4,5,6,7,7 - hexabromobicyclo[2.2.1] - 5 - heptene - 2,3-diol cyclic carbonate, 1,4,5,6 - tetrachloro - 7,7 - difluorobicyclo[2.2.1] - 5-heptene-2,3-diol cyclic carbonate, etc.

The preparation of 1,4,5,6,7,7 - hexachlorobicyclo [2.2.1]-5-heptene-2,3-diol carbonate, for example, may be carried out as follows:

Example 1

A mixture of 8.6 g. (0.1 mole) of vinylene carbonate with 28.5 g. (approximately 0.1 mole) of hexachlorocyclopentadiene in 50 ml. of o-dichlorobenzene was refluxed for four hours. Removal of the solvent by vacuum distillation left 39 g. of solid, which was recrystallized from hexane, giving 35 g. (94.5 percent yield) of 1,4,5,6,7,7 - hexachlorobicyclo[2.2.1] - 5 - heptene-2,3-diol cyclic carbonate, white needles, melting at 232–233° C.

1,4,5,6,7,7 - hexachloro - 2 - methylbicyclo[2.2.1] - 5-heptene-2,3-diol cyclic carbonate is prepared similarly, by reaction of 1-propene-1,2-diol cyclic carbonate with hexachlorocyclopentadiene.

The aforementioned carbonates are relatively stable compounds; for example, on refluxing the product of Example 1 with a chlorophenoxyacetic acid in toluene for four hours, the starting materials were recovered substantially unchanged. However, we have found that the carbonates can be cleaved to the reactive diols by treatment with acidic hydrolysis catalysts. The hydrolysis of the cyclic carbonates to the present diols may be represented as follows:

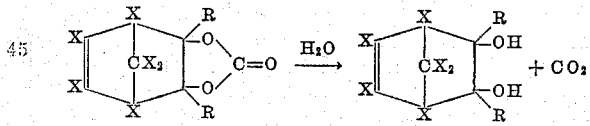

where X is a halogen having an atomic weight of below 100, and R is hydrogen or a hydrocarbon radical of from 1 to 6 carbon atoms.

In hydrolyzing the carbonate to the diol, the carbonate is simply contacted with a small amount of an acidic hydrolysis catalyst, preferably in an ionizing solvent medium. The hydrolysis catalyst may be present in an amount of from 0.1 to 20 percent, preferably 1 to 5 percent by weight of the carbonate. As examples of hydrolysis catalysts may be mentioned, for example, mineral acids such as hydrochloric, sulfuric or phosphoric acids, etc. The solvent medium for the reaction may be any ionizing solvent, such as water, ethyl alcohol, or mixtures thereof, dioxane, etc. If the hydrolysis reaction is carried out in solution in a lower alkyl alcohol, such as ethanol, the products of the reaction will include, in addition to the halobicycloheptenediol, the dialkyl carbonate corresponding to the alkyl alcohol employed as solvent; the dialkyl carbonate may then be recovered at the end of the reaction, e. g., by distillation. The temperature of the reaction mixture may vary from ambient room temperature up to the reflux temperature of the mixture; while atmospheric pressures are useful, sub- or super-atmospheric pressures may be applied to the reaction if desired. The cyclic carbonate is simply contacted with the acidic catalyst, e. g., by stirring, refluxing, etc., until the hydrolysis is complete; the reaction may require, for example, from 0.5 to 30 hours. On completion of the reaction, if water is used as a solvent, any residual acid in the aqueous solution may be neutralized with a weakly basic compound, such as sodium carbonate, sodium acetate, etc. The product diol is isolated by distilling off the solvent and decanting, extracting, etc., as illustrated below.

Examples of the diols provided by the above procedure are:

1,4,5,6,7,7 - hexachloro - 2 - methylbicyclo[2.2.1] - 5-heptene-2,3-diol,
1,4,5,6,7,7 - hexachloro - 2 - ethylbicyclo[2.2.1] - 5-heptene-2,3-diol,
1,4,5,6,7,7 - hexachloro - 2 - phenylbicyclo[2.2.1] - 5-heptene-2,3-diol,
1,4,5,6,7,7 - hexachloro - 2,3 - dimethylbicyclo[2.2.1]-5-heptene-2,3-diol,
1,4,5,6,7,7 - hexachloro - 2 - methyl - 3 - phenylbicyclo[2.2.1]-5-heptene-2,3-diol,
1,4,5,6,7,7 - hexachlorobicyclo[2.2.1] - 5 - heptene - 2,3-diol,
1,4,5,6,7,7 - hexabromobicyclo[2.2.1] - 5 - heptene - 2,3-diol,
1,4,5,6 - tetrachloro - 7,7 - difluorobicyclo[2.2.1] - 5-heptene-2,3-diol,
1,4,5,6 - tetrachloro - 7,7 - difluoro - 2 - methylbicyclo[2.2.1]-5-heptene-2,3-diol,
1,4,5,6 - tetrachloro - 7,7 - difluoro - 2 - phenylbicyclo[2.2.1]-5-heptene-2,3-diol,
1,4,5,6 - tetrachloro - 7,7 - difluoro - 2,3 - dimethylbicyclo[2.2.1]-5-heptene-2,3-diol, etc.

The procedure of preparing these diols is further illustrated, but not limited, by the following examples:

Example 2

To a medium consisting of 100 ml. water and 125 ml. ethanol, 17.9 g. of the product of Example 1 and one ml. of concentrated hydrochloric acid (1.18 sp. gr.) were added, and the mixture was refluxed for 16.5 hours. At the end of this time, the reaction mixture was neutralized with sodium acetate and subjected to vacuum distillation to remove the ethanol, whereupon an oily layer separated from the aqueous solution. The oil was decanted and mixed with two 100 ml. portions of ether with which the aqueous layer had been extracted; this mixture was decolorized with active charcoal and dried. Evaporation of the ether left a residue which was again treated with active charcoal and recrystallized from hexane, giving 10 g. of small white needles, melting at 240° C. The identity of this product with the desired 1,4,5,6,7,7-hexachlorobicyclo[2.2.1]-5-heptene-2,3-diol was indicated by the characteristics of its infrared spectrum, and corroborated by the following analysis:

|            | Found | Calculated for $C_7H_4Cl_6O_2$ |
|------------|-------|-------------------------------|
| Percent C  | 25.36 | 25.27 |
| Percent H  | 1.80  | 1.13  |
| Percent Cl | 64.17 | 63.92 |

A further 5 grams of material, melting at 239° C., were recovered by concentration of the filtrate, making the total hydrolysis yield 15 grams, or 90 percent of theoretical.

Example 3

In 1000 ml. of a 2:3 water-ethanol mixture, 147.6 g. of the product of Example 1 was refluxed for 16 hours with 10 ml. of concentrated (28 percent) hydrochloric acid. On removal of the ethanol by distillation, an oil separated; this was removed, the aqueous layer was extracted twice with 200 ml. portions of ether, and the ether extracts were combined with the oil. After the combined oil and ether solutions had been dried, the ether was removed and the resulting solid dissolved in a minimum of benzene. On addition of hexane to the benzene, 80 g. of crystals, melting at 236–237° C., separated. Concentration of the filtrate yielded another 61 g. of crystals, which were combined with the first crop, treated with charcoal and recrystallized from benzene-hexane, giving 110 g., melting at 239–240° C., of the diol.

The hexahalobicycloheptenediols are stable, well-defined crystalline compounds which are useful for a variety of agricultural and industrial purposes. They may be used, for example, in the preparation of condensation polymers, either the alkyd type, in which the alcohol groups are reacted with polycarboxylic acids, or the polyurethan type, in which the hydroxy groups are reacted with polyisocyanates; when used in such resins, the diols may impart, for example, excellent flame-proofing properties to the polymer. The diols of the invention are reactive compounds which are of great utility in organic synthesis, e. g., in the preparation of compounds further described below. The hexahalobicycloheptenediols and their derivatives, furthermore, are active biological toxicants, possessing a wide spectrum of biological activity; they are active, for example, as herbicides, fungicides, bactericides, and nematocides, etc.

By esterification of the diols described above, new and useful esters are provided. The new bicyclic carboxylic acid esters provided by the present invention may be illustrated by the following formula

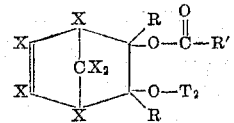

where X is a halogen having an atomic weight of below 100, R is hydrogen or a hydrocarbon radical of from 1 to 6 carbon atoms, R' is a hydrocarbon radical containing from 1 to 18 carbon atoms and from 0 to 2 carbocyclic rings containing up to 6 carbon atoms per ring and $T_2$ is hydrogen or a hydrocarboncarbonyl

radical, where R' is as defined above. Esters of the above formula are readily prepared by contacting the present diols with a carboxylic acid of the formula

or with a reactive carboxylic acid derivative, such as a carboxylic acid halide of the formula

where X is halogen, or a carboxylic acid anhydride of the formula

where R' in the above formulae is as defined above. Examples of suitable carboxylic acids which may be used in preparing the present esters are, e. g., acrylic acid, butyric acid, vinylacetic acid, 2-ethylhexanoic acid, benzoic acid, cyclohexanecarboxylic acid, etc. Examples of suitable acid halides for preparing these bicyclic esters are: propionyl chloride, hexanoyl bromide, p-toluyl chloride, etc. Examples of acid anhydrides which are useful in the synthesis of the present esters are acetic anhydride, butyric anhydride, benzoic anhydride, etc.

Depending on the reaction conditions and the relative ratios of diol and acid or acid derivative used, there are prepared monoesters of the present diols, of the above formula where $T_2$ is hydrogen, or diesters of the above formula, where $T_2$ is a hydrocarboncarbonyl radical. Examples of monoesters of the present diols prepared in accordance with this invention are, e. g., 1,4,5,6,7,7-hexachlorobicyclo[2.2.1] - 5 - heptene-2,3-diol monoacetate,
1,4,5,6,7,7-hexachlorobicyclo[2.2.1] - 5 - heptene-2,3-diol monopropionate,
1,4,5,6,7,7-hexachlorobicyclo[2.2.1] - 5 - heptene-2,3-diol monoacrylate,
1,4,5,6,7,7-hexachlorobicyclo[2.2.1] - 5 - heptene-2,3-diol mono-2-ethylhexanoate,
1,4,5,6,7,7-hexachlorobicyclo[2.2.1] - 5 - heptene-2,3-diol monododecanoate,
1,4,5,6 - tetrachloro-7,7-difluorobicyclo[2.2.1]-5-heptene-2,3-diol monoacetate,
1,4,5,6 - tetrachloro-7,7-difluorobicyclo[2.2.1]-5-heptene-2,3-diol monopentanoate,
1,4,5,6 - tetrachloro-7,7-difluorobicyclo[2.2.1]-5-heptene-2,3-diol mono-(vinylacetate),
1,4,5,6,7,7 - hexachloro - 2 - methylbicyclo[2.2.1] - 5-heptene-2,3-diol monoacetate,
1,4,5,6,7,7 - hexachloro - 2 - methylbicyclo[2.2.1] - 5-heptene-2,3-diol monononanoate,
1,4,5,6,7,7 - hexachloro - 2 - phenylbicyclo[2.2.1] - 5-heptene-2,3-diol monoacetate,
1,4,5,6,7,7 - hexachloro - 2 - phenylbicyclo[2.2.1] - 5-heptene-2,3-diol monoacrylate, etc.

Diesters of alkanoic monocarboxylic acids provided by the present invention are, e. g.:

1,4,5,6,7,7 - hexachlorobicyclo[2.2.1] - 5-heptene-2,3-diol diacetate,
1,4,5,6,7,7 - hexachlorobicyclo[2.2.1] - 5-heptene-2,3-diol dipropionate,
1,4,5,6,7,7 - hexachlorobicyclo[2.2.1] - 5-heptene-2,3-diol diacrylate,
1,4,5,6,7,7 - hexachlorobicyclo[2.2.1] - 5-heptene-2,3-diol dibutyrate,
1,4,5,6,7,7 - hexachlorobicyclo[2.2.1] - 5-heptene-2,3-diol dihexanoate,
1,4,5,6,7,7 - hexachlorobicyclo[2.2.1] - 5-heptene-2,3-diol di(2-ethylhexanoate),
1,4,5,6,7,7 - hexachlorobicyclo[2.2.1] - 5-heptene-2,3-diol dinonanoate,
1,4,5,6,7,7 - hexachloro - 2 - methylbicyclo[2.2.1] - 5-heptene-2,3-diol diacetate,
1,4,5,6,7,7 - hexachloro - 2 - methylbicyclo[2.2.1] - 5-heptene-2-3-diol di(2-ethylhexanoate),
1,4,5,6,7,7 - hexachloro-2-phenylbicyclo[2.2.1]-5-heptene-2,3-diol diacetate,
1,4,5,6,7,7 - hexachloro-2-phenylbicyclo[2.2.1]-5-heptene-2,3-diol dipropionate,
1,4,5,6,7,7 - hexachloro-2-phenylbicyclo[2.2.1]-5-heptene-2,3-diol di(2-ethylhexanoate),
1,4,5,6 - tetrachloro - 7,7-difluoro-2-methylbicyclo[2.2.1]-5-heptene-2,3-diol diacetate,
1,4,5,6 - tetrachloro - 7,7-difluoro-2-methylbicyclo[2.2.1]-5-heptene-2,3-diol diacrylate,
1,4,5,6 - tetrachloro - 7,7-difluoro-2-methylbicyclo[2.2.1]-5-heptene-2,3-diol didodecanoate, etc.

In addition to esters of the present diols with alkanoic, alkenoic and haloalkanoic acids as shown above, the diols of the invention may be condensed with aromatic acids, to provide esters such as:

1,4,5,6,7,7 - hexachlorobicyclo[2.2.1] - 5-heptene-2,3-diol monobenzoate,
1,4,5,6,7,7 - hexachlorobicyclo[2.2.1] - 5-heptene-2,3-diol di-p-toluate,
1,4,5,6,7,7 - hexachloro - 2 - methylbicyclo[2.2.1] - 5-heptene-2,3-diol mono-2-naphthoate,
1,4,5,6,7,7 - hexachloro - 2 - methylbicyclo[2.2.1] - 5-heptene-2,3-diol dibenzoate,
1,4,5,6 - tetrachloro-7,7-difluorobicyclo[2.2.1]-5-heptene-2,3-diol dibenzoate, etc., and with araliphatic and cycloaliphatic acids, to provide esters such as:

1,4,5,6,7,7 - hexachlorobicyclo[2.2.1]- 5 -heptene-2,3-diol mono(phenylacetate),
1,4,5,6,7,7 - hexachlorobicyclo[2.2.1]- 5 -heptene-2,3-diol mono(naphthylacetate),
1,4,5,6,7,7 - hexachlorobicyclo[2.2.1] - 5-heptene-2,3-diol di(3-phenylpropionate),
1,4,5,6,7,7 - hexachloro - 2 - methylbicyclo[2.2.1] - 5-heptene-2,3-diol mono(p-tolylacetate),
1,4,5,6,7,7 - hexachloro - 2 - methylbicyclo[2.2.1] - 5-heptene-2,3-diol di(cyclohexylcarboxylate),
1,4,5,6,7,7-hexabromobicyclo[2.2.1] - 5 - heptene-2,3-diol di-(4-naphthylbutyrate),
1,4,5,6 - tetrachloro-7,7-difluorobicyclo[2.2.1]-5-heptene-2,3-diol mono(phenylacetate),
1,4,5,6 - tetrachloro-7,7-difluoro-2-methylbicyclo[2.2.1]-5-heptene-2,3-diol di(o-tolylacetate), etc.

To prepare the present esters, the diol is contacted with the acid or acid derivative, preferably in the presence of a condensation catalyst. The free acid may be employed, if desired, but it is preferred to use an acid derivative such as the acid halide or anhydride. Suitable acid halides are, e. g., acetyl chloride, propionyl chloride, etc. Particularly suitable for the present process are the acid anhydrides, such as acetic, propionic, butyric, pentanoic, and benzoic acid anhydrides, for example. The condensation to form the ester is preferably carried out in the presence of a dehydrating condensation catalyst. Suitable catalysts are, for example, mineral acids such as sulfuric or hydrochloric acids, or gaseous hydrogen chloride, or a salt of a weak acid, such as sodium acetate. The reaction mixture may be heated, if desired, but generally heating is not necessary, since the reaction is usually exothermic. A possible procedure is to cool the reaction when the reactants are first mixed, and later to heat it to drive the reaction towards completion. Depending on the reactants, solvents or diluents may or may not be used, i. e., a solvent will be necessary if both reactants are solid at reaction temperature. Sub- or super-atmospheric pressures may be applied if desired. The proportions of the reactants will be determined by whether a mono- or di-ester is desired. In reacting a monocarboxylic anhydride, such as acetic anhydride, with one of the diols of the present invention, there may be used, for example, one mole of anhydride, or a slight excess above this, to one mole of diol, to produce a diester. A monocarboxylic acid halide will require two moles per mole of diol, by the stoichiometry of the reaction to produce a diester, or one mole per mole of diol, to make the monoester. An excess of either the acid derivative or the diol may be employed, if desired, for example, to drive the reaction towards completion in the desired direction, i. e., to give the mono- or the di-ester; unreacted acid or diol is then removed at the end of the reaction. The condensation promoter, i. e., sulfuric or hydrochloric acid, etc., need be present only in catalytic amounts.

The esters prepared by the present process are liquid to crystalline solid stable materials which have a variety of uses. For example, the esters with long-chain acids such as 2-ethylhexanoic acid may be useful as plasticizers. The esters with unsaturated acids such as acrylic acid are potential monomers for preparation of addition polymers, to which they may impart flexibility and flame-resistance. The esters of the diols are particularly useful as biological toxicants, i. e., as fungicides and nematocides. The preparation of the present carboxylic acid esters is further illustrated, but not limited, by the following examples:

*Example 4*

A mixture of 6.9 g. of the product of Example 2, 50 ml. of acetic anhydride and 0.5 g. of anhydrous sodium acetate was refluxed for one hour, then cooled and poured into 250 ml. of a mixture of ice and water. A brownish solid crystallized and was separated by filtration and dried, giving 9 g. of brownish crystals, which were recrystallized twice from hexane, giving 7 grams of very large crystals which melted at 110–111° C. The product, 1,4,5,6,7,7-hexachlorobicyclo[2.2.1]-5-heptene-2,3-diol diacetate, analyzed as follows:

|  | Found | Calculated for $C_{11}H_8Cl_6O_6$ |
|---|---|---|
| Percent C | 32.07 | 31.69 |
| Percent H | 2.44 | 1.94 |

Example 5

The procedure of the above example was varied as follows: A mixture of 13.8 g. of the diol of Example 2 with 100 ml. of 95 percent acetic anhydride and two drops of concentrated sulfuric acid was allowed to stand for one hour (exothermic reaction). After addition of ice ice and water to decompose the excess acetic anhydride, a white precipitate settled, was filtered off and dried. After recrystallization from hexane, there were obtained 17 g. (98 percent yield) of the diacetate, melting at 111° C.

In addition to the carboxylic acid esters of hexahalobicycloheptenediols, the present invention also includes the carbamate esters of these diols.

Carbamic acid esters are preferably prepared from isocyanates, when the N-monosubstituted derivative is desired, and from carbamyl halides, when the N-disubstituted derivatives are required. With the present diols, either monocarbamate esters, i. e., those in which one hydroxy group of the diol is esterified, of N-mono- and N-di-substituted carbamic acids, or dicarbamate esters in which both hydroxy groups of the diol are esterified, of N-mono- and N-disubstituted carbamic acids can be prepared. These esters may be represented by the general formula

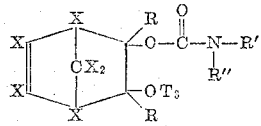

where X is a halogen having an atomic weight of below 100 and R is hydrogen or a hydrocarbon radical of from 1 to 6 carbon atoms, R' is a hydrocarbon radical containing from 1 to 18 carbon atoms and from 0 to 2 carbocyclic rings containing up to 6 carbon atoms per ring, R'' is selected from the class consisting of hydrogen and R', and $T_3$ is selected from the class consisting of hydrogen and hydrocarboncarbamyl radicals of the formula

where R' and R'' are as defined above. While the carbamic acid esters of the present diols could be prepared by alcoholysis, we prefer to prepare the carbamates of the invention by reaction of the halobicycloheptenediols with isocyanates or with carbamyl halides.

To prepare the present N-monosubstituted carbamates, there may be used an alkyl, cycloalkyl, aralkyl or aryl monoisocyanate. The isocyanates are readily available, commercial materials; they may be prepared, e. g., by reaction of a primary amine with phosgene. Examples of monoisocyanates suitable for use in the present process are: alkyl isocyanates such as methyl isocyanate, ethyl isocyanate, propyl isocyanate, hexyl isocyanate, octadecyl isocyanate, hexadecyl isocyanate, octadecenyl isocyanate, etc.; cycloalkyl isocyanates such as cyclohexyl isocyanate; aryl isocyanates, e. g., phenyl isocyanate, tolyl isocyanate, 2-naphthyl isocyanate, etc., and aralkyl isocyanates, such as phenethyl isocyanate, etc.

Monocarbamates which may be prepared by reaction of the present diols and isocyanates include, e. g., 1,4,5,6,7,7-hexachlorobicyclo[2.2.1]-5-heptene-2,3-diol mono(methylcarbamate),
1,4,5,6,7,7-hexachlorobicyclo[2.2.1]-5-heptene-2,3-diol mono(ethylcarbamate),
1,4,5,6,7,7-hexachlorobicyclo[2.2.1]-5-heptene-2,3-diol mono(octadecylcarbamate),
1,4,5,6-tetrachloro-7,7-difluorobicyclo[2.2.1]-5-heptene-2,3-diol monocarbanilate,
1,4,5,6-tetrachloro-7,7-difluorobicyclo[2.2.1]-5-heptene-2,3-diol mono(methylcarbamate),
1,4,5,6-tetrachloro-7,7-difluorobicyclo[2.2.1]-5-heptene-2,3-diol mono(octadecylcarbamate),
1,4,5,6,7,7-hexachloro-2-methylbicyclo[2.2.1]-5-heptene-2,3-diol monocarbanilate,
1,4,5,6,7,7-hexachloro-2-phenylbicyclo[2.2.1]-5-heptene-2,3-diol monocarbanilate, etc.

Dicarbamate esters which may be prepared by reaction of the present diols with isocyanates include, e. g., 1,4,5,6,7,7-hexachloro-2-methylbicyclo[2.2.1]-5-heptene-2,3-diol di(methylcarbamate),
1,4,5,6,7,7-hexachloro-2-phenylbicyclo[2.2.1]-5-heptene-2,3-diol di(methylcarbamate),
1,4,5,6,7,7-hexachloro-2,3-dimethylbicyclo[2.2.1]-5-heptene-2,3-diol di(methylcarbamate),
1,4,5,6,7,7-hexachloro-2-methylbicyclo[2.2.1]-5-heptene-2,3-diol di(ethylcarbamate),
1,4,5,6,7,7-hexachloro-2-phenylbicyclo[2.2.1]-5-heptene-2,3-diol di(ethylcarbamate),
1,4,5,6,7,7-hexachloro-2,3-dimethylbicyclo[2.2.1]-5-heptene-2,3-diol di(ethylcarbamate),
1,4,5,6,7,7-hexachloro-2-methylbicyclo[2.2.1]-5-heptene-2,3-diol di(octadecylcarbamate),
1,4,5,6,7,7-hexachloro-2-propylbicyclo[2.2.1]-5-heptene-2,3-diol di(octadecylcarbamate),
1,4,5,6,7,7-hexachloro-2-phenylbicyclo[2.2.1]-5-heptene-2,3-diol di(hexadecylcarbamate),
1,4,5,6,7,7-hexachloro-2-phenylbicyclo[2.2.1]-5-heptene-2,3-diol dicarbanilate,
1,4,5,6-tetrachloro-7,7-difluorobicyclo[2.2.1]-5-heptene-2,3-diol di(methylcarbamate),
1,4,5,6-tetrachloro-7,7-difluorobicyclo[2.2.1]-5-heptene-2,3-diol di(ethylcarbamate),
1,4,5,6-tetrachloro-7,7-difluorobicyclo[2.2.1]-5-heptene-2,3-diol di(octadecylcarbamate),
1,4,5,6-tetrachloro-7,7-difluorobicyclo[2.2.1]-5-heptene-2,3-diol dicarbanilate, etc.

It will be readily evident to those skilled in the art that reaction of the present diols with diisocyanates under polymerizing conditions will give valuable polyurethan resins of the type

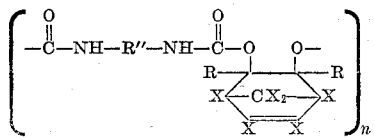

where X, R, and R'' are as hereinbefore defined. However, this invention also contemplates the reaction of the present diols with diisocyanates in which the isocyano groups are of different reactivities, so that monomeric carbamate esters are obtained, e. g., of the type

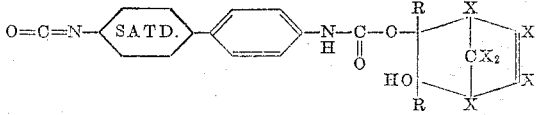

In addition to the above-listed N-monosubstituted carbamate esters of the present diols, the N-disubstituted carbamate esters of the present diols are also included in the invention. The present N-disubstituted carbamate esters may be prepared as mentioned above, by reaction of one of the diols of this invention with an N-disubstituted carbamyl halide, as illustrated by the following equation showing the reaction of 1,4,5,6-tetrachloro-7,7-difluoro-2-methylbicyclo[2.2.1]-5-heptene - 2,3 - diol with dimethylcarbamyl chloride to produce 1,4,5,6-tetrachloro-7,7-difluoro-2-methylbicyclo[2.2.1]-5-heptene - 2,3 - diol bis(dimethylcarbamate)

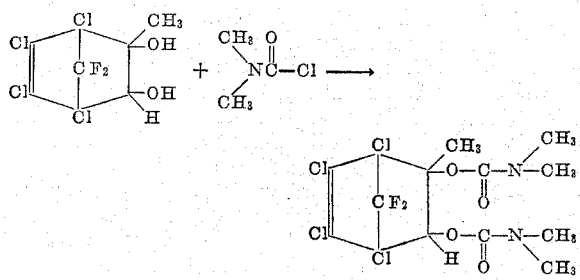

As in the case of the reaction of the present diols with isocyanates, the conditions of reaction may be controlled to produce either the monoester or the diester of the diol. Examples of N-disubstituted carbamyl halides useful in preparing the present esters are dialkylcarbamyl halides such as dimethylcarbamyl chloride, dipropylcarbamyl bromide, etc., di(aralkyl)carbamyl halides such as dibenzylcarbamyl chloride, diarylcarbamyl halides such as diphenylcarbamyl chloride, di-o-tolylcarbamyl chloride, etc. The N-disubstituted carbamyl chlorides are prepared, e. g., by reaction of a disubstituted amine with phosgene. The products which may be produced by the present method include monoesters such as:

1,4,5,6,7,7-hexachlorobicyclo[2.2.1]-5-heptene - 2,3 - diol mono(dimethylcarbamate),
1,4,5,6,7,7-hexachlorobicyclo[2.2.1]-5-heptene - 2,3 - diol mono(diphenylcarbamate),
1,4,5,6,7,7-hexachlorobicyclo[2.2.1]-5-heptene - 2,3 - diol mono(dibenzylcarbamate),
1,4,5,6,7,7-hexachloro-2 - methylbicyclo[2.2.1] - 5 - heptene-2,3-diol mono(dimethylcarbamate),
1,4,5,6-tetrachloro-7,7-difluorobicyclo[2.2.1]-5 - heptene-2,3-diol mono(dimethylcarbamate),
1,4,5,6-tetrachloro-7,7-difluorobicyclo[2.2.1]-5 - heptene-2,3-diol mono(diisopropylcarbamate),
1,4,5,6,7,7-hexachloro - 2 - phenylbicyclo[2.2.1] - 5 - heptene-2,3-diol mono(ditolylcarbamate), etc., and diesters such as:
1,4,5,6,7,7-hexachlorobicyclo[2.2.1]-5-heptene - 2,3 - diol bis(dimethylcarbamate),
1,4,5,6,7,7-hexachlorobicyclo[2.2.1]-5-heptene - 2,3 - diol bis(dibutylcarbamate),
1,4,5,6,7,7-hexachlorobicyclo[2.2.1]-5-heptene - 2,3 - diol bis(dinaphthylcarbamate),
1,4,5,6,7,7-hexabromobicyclo[2.2.1]-5-heptene - 2,3 - diol bis(dimethylcarbamate),
1,4,5,6-tetrachloro-7,7-difluorobicyclo[2.2.1]-5 - heptene-2,3-diol bis(diethylcarbamate),
1,4,5,6,7,7-hexachloro-2-ethylbicyclo[2.2.1] - 5 - heptene-2,3-diol bis(dinonylcarbamate), etc.

The carbamate esters of the diols of the present invention are prepared by simply contacting the diol with the isocyanate or the carbamyl halide. We have found that the extent of esterification appears to depend on the duration of contact and the reaction temperatures; thus, the monocarbamate of the diol is first formed, and on continued heating, the dicarbamate is obtained. The temperature at which the condensation of the diol with the isocyanate or carbamyl halide takes place may vary from 50 to 200° C., preferably 80–120° C. Sub- or super-atmospheric pressures may be used, if desired. The reaction may take place without a solvent medium i. e., if the isocyanate is a liquid; or a solvent or diluent may be used. Suitable media for the reaction are, e. g., aromatic hydrocarbons such as benzene or toluene, aliphatic solvents such as cyclohexane or hexane, halogenated solvents such as ethylene dichloride, oxygenated solvents such as dioxane, isobutyl acetate, etc. Catalysts for the reaction, such as aluminum chloride, may be used if desired, but are not generally necessary. The proportions of diol and isocyanate or carbamyl halide used will depend, e. g., on whether the mono- or di-ester is desired. Equimolecular proportions of diol and isocyanate, for example, may be used, to form the monocarbamate, while two or more moles of isocyanate per mole of diol may be used for making the dicarbamate. If desired, an excess of one of the reactants may be used, e. g., to facilitate the preparation of a particular desired product, i. e., the mono- or the di-ester; the unreacted excess material may be readily removed at the end of the reaction. The reaction is generally complete within 2 to 30 hours, depending on the diol and isocyanate used; on removal of the solvent, the product readily separates.

The present carbamates are stable, high-melting crystalline compounds which are useful for a variety of industrial and agricultural applications, e. g., as dielectrics, for the preparation of surface-active quaternary compounds, as biological toxicants, etc.

The preparation of the carbamates of the invention is further illustrated by the following examples:

*Example 6*

A mixture of 16.7 grams (0.05 mole) of 1,4,5,6,7,7-hexachlorobicyclo[2.2.1]-5-heptene-2,3-diol with 11.9 grams (0.1 mole) of phenyl isocyanate in 100 ml. of dry toluene was refluxed for 20 hours. After removal of the solvent and recrystallization of the residual solid from carbon tetrachloride, 10 g. of the dicarbanilate of the diol was obtained. This material melted at 174–176° C. and analyzed as follows:

|  | Found | Calculated for $C_{21}H_{14}Cl_6N_2O_4$ |
|---|---|---|
| Percent C | 43.54 | 44.17 |
| Percent H | 2.92 | 2.47 |
| Percent Cl | 38.51 | 37.24 |
| Percent N | 5.04 | 4.91 |

*Example 7*

On refluxing a mixture of 16.7 g. of the diol of Example 2 with 11.9 g. of phenyl isocyanate in 100 ml. of benzene for 8 hours, removal of the solvent and solidification of the residue by treatment with hexane, followed by recrystallization from a toluene-hexane mixture, there resulted a white microcrystalline solid, weighing 14 g., and melting at 168–169° C. Recrystallization from carbon tetrachloride again gave 14 g. melting at 168–169° C. This compound analyzed as follows:

|  | Found | Calculated for $C_{14}H_9Cl_6NO_3$ |
|---|---|---|
| Percent C | 37.68 | 37.21 |
| Percent H | 2.46 | 2.01 |
| Percent Cl | 46.38 | 47.06 |
| Percent N | 3.30 | 3.10 |

The product of this reaction was thus the 1,4,5,6,7,7-hexachlorobicyclo[2.2.1] - 5 - heptene - 2,3 - diol monocarbanilate.

*Example 8*

By reaction of two moles of dimethylcarbamyl chloride with one mole of the diol of Example 2 in benzene solution, 1,4,5,6,7,7 - hexachlorobicyclo[2.2.1] - 5 - heptene-2,3-diol bis(dimethylcarbamate) is prepared.

A further embodiment of the present invention is the reaction of the diols described hereinabove with aldehydes and ketones to produce acetals. The general reaction is:

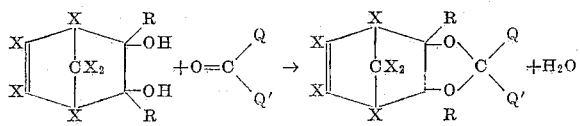

where X is a halogen having an atomic weight of below 100, R is hydrogen or a hydrocarbon radical of from 1 to 6 carbon atoms, Q taken separately is a hydrocarbon radical free of aliphatic unsaturation and containing up to 6 carbon atoms, Q' taken separately is selected from Q and hydrogen, and Q and Q' taken together represent a chain of up to 5 carbon atoms, the terminal carbon atoms of which are singly bonded to the carbon atom to which Q and Q' are attached, wherein the carbon atoms of the said chain of carbon atoms are attached to substituents selected from the class consisting of hydrogen, chlorine and lower alkyl radicals. The products when Q and Q' are taken separately are tricyclic dioxanes, e. g., the product of the reaction of acetone and hexachlorobicyclo[2.2.1] - 5 - heptene - 2,3 - diol has the formula

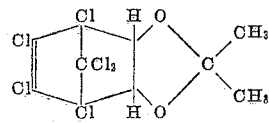

which may be named 1,7,8,9,10,10-hexachloro-4,4-dimethyl-3,5-dioxatricyclo[5.2.1.0$^{2,6}$]-8-decene, i. e., the acetone acetal of 1,4,5,6,7,7-hexachlorobicyclo[2.2.1]-5-heptene-2,3-diol; and when Q and Q' taken together are a bivalent carbon chain, the products are tetracyclic, e. g.

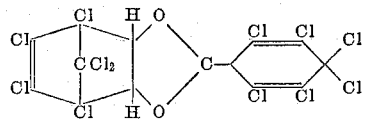

which may be named 1',2,3,4,4,5,6,7',8',9',10',10'-dodecachlorospiro[2,5 - cyclohexadiene - 1,4'-3',5' - dioxatricyclo[5.2.1.0$^{2',6'}$]-8'-decene], or, the hexachloro-2,5-cyclohexadien-1-one acetal of 1,4,5,6,7,7-hexachlorobicyclo[2.2.1]-5-heptene-2,3-diol.

Thus, there may be prepared the acetone acetal of 1,4,5,6,7,7 - hexachlorobicyclo[2.2.1] - 5 - heptene - 2,3-diol, the 2-butanone acetal of 1,4,5,6,7,7-hexachlorobicyclo[2.2.1]-5-heptene-2,3-diol, the 2-pentanone acetal of 1,4,5,6,7,7 - hexachlorobicyclo[2.2.1] - 5 - heptene-2,3-diol, the 3-pentanone acetal of 1,4,5,6,7,7-hexachlorobicyclo[2.2.1]-5-heptene-2,3-diol, the 2-hexanone acetal of 1,4,5,6,7,7 - hexachlorobicyclo[2.2.1] - 5 - heptene-2,3-diol, the acetophenone acetal of 1,4,5,6,7,7-hexachlorobicyclo[2.2.1]-5-heptene-2,3-diol, the isophorone acetal of 1,4,5,6,7,7 - hexachlorobicyclo[2.2.1] - 5 - heptene - 2,3-diol, the acetaldehyde acetal of 1,4,5,6,7,7-hexachlorobicyclo[2.2.1]-5-heptene-2,3-diol, the heptaldehyde acetal of 1,4,5,6,7,7-hexachlorobicyclo[2.2.1] - 5 - heptene - 2,3-diol, the benzaldehyde acetal of 1,4,5,6,7,7-hexachlorobicyclo[2.2.1]-5-heptene-2,3-diol, the furfural acetal of 1,4,5,6,7,7 - hexachlorobicyclo[2.2.1] - 5 - heptene - 2,3-diol, the hexachloro-2,5-cyclohexadien-1-one acetal of 1,4,5,6,7,7 - hexachlorobicyclo[2.2.1] - 5 - heptene - 2,3-diol, the 2-butanone acetal of 1,4,5,6-tetrachloro-7,7-difluorobicyclo[2.2.1]-5-heptene-2,3-diol, the 2-hexanone acetal of 1,4,5,6-tetrachloro-7,7-difluorobicyclo[2.2.1]-5-heptene-2,3-diol, the acetophenone acetal of 1,4,5,6-tetrachloro - 7,7 - difluorobicyclo[2.2.1] - 5 - heptene-2,3-diol, the benzophenone acetal of 1,4,5,6-tetrachloro-7,7-difluorobicyclo[2.2.1]-5-heptene-2,3-diol, the acetone acetal of 1,4,5,6,7,7-hexachloro-2-methylbicyclo[2.2.1]-5-heptene-2,3-diol, the isophorone acetal of 1,4,5,6,7,7-hexachloro-2-phenylbicyclo[2.2.1]-5-heptene-2,3-diol, etc.

The above and similar acetals are readily prepared by simply contacting the diols of the present invention with a ketone or aldehyde in the presence of an acidic catalyst. As examples of catalysts for acetal formation may be listed salts such as calcium, zinc or ferric chlorides; boron trifluoride, ammonium chloride and dry hydrogen chloride, as well as organic acids such as benzene-sulfonic acid, p-toluenesulfonic acid, etc. The reaction may be carried out in the absence or presence of a solvent or diluent. As solvents may be used inert liquids such as benzene, toluene, xylene, ethylene dichloride, hexane, cyclohexane, etc. The diol and ketone or aldehyde can be present in equimolecular quantities, as required by the stoichiometry of the reaction as shown above, or a slight excess of the more readily available component may be used. Ordinary atmospheric, or sub- or superatmospheric pressures may be employed, as desired. The temperatures of the reaction depends on the reactants, and may vary from ambient room temperature to 200° C., preferably 40–130° C. The reaction is complete within from a few mintues to 20 hours; the reaction mixture is then neutralized and the acetal isolated, e. g., by extraction, distillation, etc.

The present acetals are high-melting, stable solids, useful in the chemical and allied industries, e. g., as intermediates, plasticizers (particularly the acetals of long-chain aldehydes or ketones), etc., and also of utility in biological and agricultural applications. They are active, for example, as toxicants, e. g., as fungicides, nematocides, etc. Their preparation is illustrated by the following examples:

*Example 9*

Anhydrous gaseous hydrogen chloride was passed into 50 ml. of anhydrous acetone until two grams had been absorbed. Then 6.9 grams of the diol of Example 2 were added to the acetone and the mixture was refluxed for four hours. After cooling, the reaction mixture was poured into 250 ml. of water containing sodium carbonate in an amount in excess of that required to neutralize the hydrogen chloride. The mixture was immediately extracted with ether. After evaporation of the ether, there was obtained a solid, very soluble in hexane, which was recrystallized twice from 80 percent aqueous ethanol, leaving 5.0 grams of the acetone acetal of hexachlorobicyclo[2.2.1]-5-heptene-2,3-diol, melting at 77–78° C., with the characteristic odor of acetals, analyzing as follows:

|  | Found | Calculated for $C_{10}H_8O_2Cl_6$ |
|---|---|---|
| Percent C | 32.33 | 32.21 |
| Percent H | 2.58 | 2.16 |
| Percent Cl | 55.98 | 57.04 |

*Example 10*

Treatment of 6.7 grams (0.02 mole) of the diol of Example 2 and 6.0 grams (0.02 mole) of hexachloro-2,5-cyclohexadien-1-one with 1.0 gram of p-toluenesulfonic acid monohydrate in 100 ml. of toluene by refluxing for four hours (0.2 ml. of water collected), neutralization and drying gives the hexachloro-2,5-cyclohexadien-1-one acetal of 1,4,5,6,7,7-hexachlorobicyclo[2.2.1]-5-heptene-2,3-diol.

It will be readily apparent to those skilled in the art that the present diols, their carboxylic and carbamic acid esters, and their acetals may exist in a variety of stereochemical configurations. The bicyclic compounds may be trans, endo-cis or exo-cis. The tricyclic structures may have an endo or an exo orientation. Further possibilities with respect to enantiomorphs and diasterioisomers, etc., will be apparent to skilled stereochemists. It is intended that the present invention include all of the possible stereoisomers of the present compounds, as represented by the planar formulae given herein.

The present compounds possess outstanding biological activity, as will be illustrated below. The herbicidal effect of the diol of Example 2, e. g., was evaluated as follows:

Example 11

An 0.5 percent by weight solution of 1,4,5,6,7,7-hexachlorobicyclo[2.2.1]-5-heptene-2,3-diol in acetone was prepared, and sprayed by means of an atomizer onto two-week old seedlings of corn and of broad-leaf plants, e. g., clover, cotton and radish. The pan containing the seedlings was then placed on a wet sand bench in a greenhouse for ten days. At the end of this time, the plants were observed: whereas the broad-leaf plants were substantially unaffected by the treatment, the corn, a narrow-leaf plant species, was severely damaged.

This experiment demonstrates the activity of the present diols as selective herbicides. Application of these compounds as herbicides is usually most conveniently effected in admixture with any of the conventional adjuvants and carriers; for example, a solution of the diol may be prepared, and the resulting herbicidal composition applied as a spray from an atomizer. Another form in which the present diols may be applied to plants is as a dust, in admixture with a solid powdered carrier, such as clay, talc, pumice or bentonite. The compounds may also be applied to plants in admixture with other agricultural pesticides, e. g., insecticides or fungicides. Particularly effective as a means for the application of herbicides to living plants are emulsions of the herbicidally toxic compounds. Emulsions of the present diols may be prepared by dissolving the compound in an organic solvent, such as hexane, adding a wetting agent, and then treating the organic solution with water to form an oil-in-water emulsion. (The word "oil" is here used to designate any liquid insoluble in water.) Wetting agents which may be used to prepare such emulsions include, e. g., alkylbenzenesulfonates, polyalkylene glycols, salts of sulfated long-chain alcohols, sorbitan fatty acid esters, etc. Rates of application of the present diols to produce desired herbicidal effects may be particularly low where these compounds are applied as emulsions, i. e., rates of 3–5 lbs. per acre, or even as low as 1 lb. per acre or less, may be effective in selective eradication of weeds from desired crops.

Testing of the present compounds demonstrating their effectiveness as fungicides is illustrated below:

Example 12

Samples of 0.3 gram, respectively, of 1,4,5,6,7,7-hexachlorobicyclo[2.2.1]-5-heptene-2,3-diol (I) and 1,4,5,6,7,7-hexachlorobicyclo[2.2.1]-5-heptene-2,3-diol monocarbanilate (II), prepared as described in Examples 2 and 7, were dissolved in acetone to make one percent solutions. Portions of each of these solutions were then diluted with water to make 0.1 percent solutions, and two 0.2 ml. aliquots of the solution of I and two 0.2 ml. aliquots of the solution of II were pipetted into slide wells and evaporated to dryness. Next, to one of the wells containing I, and to one of the wells containing II were added suspensions of 5000 spores of *Stemphylium sarcinaeforme* in 0.1 ml. of water. The other two wells were treated similarly with a suspension of *Monilinia fructicola* spores.

After incubation of these slides in Petri dishes containing water for 16 to 24 hours, the percentage of spore germination was determined. It was found that both the diol (I) and the carbanilate (II) gave a 100 percent suppression of germination of the spores of Monilinia and the carbanilate (II) also gave a 100 percent suppression of germination of Stemphylium spores, while the diol (I) had killed better than 50 percent of the Stemphylium spores.

The carbanilate was then evaluated against *Stemphylium solani*, the incitant of tomato gray leaf-spot, as follows:

Example 13

A Bonny Best variety of tomatoes having four true leaves was sprayed with an atomizer until run-off with an emulsion of the carbanilate prepared by mixing a solution of the chemical in acetone, water sufficient to make a concentration of 1250 p. p. m., and as an emulsifying agent, 0.1 ml. of "Tween 20," a surface-active agent reputed to be a sorbitan monolaurate polyoxyalkylene derivative. The plant was then sprayed with a spore suspension of *Stemphylium solani*, held in an incubator at 70° F. for three days, and then removed to a greenhouse and held for two days there. At the end of this time, whereas a control tomato plant which had been treated similarly with the exception of the application of the carbanilate emulsion spray was severely diseased, the plant sprayed with the carbanilate exhibited only moderate to slight infection with leaf spot.

A similar test of the carbanilate by spraying an emulsion of this material on tomato plants which were then exposed to tomato wilt disease, by immersion of their roots in a culture of *Fusarium lycopersici*, showed that substantial suppression of this disease was also obtained, whereas unsprayed plants under the same conditions were severely damaged.

In application of the present compounds as fungicides, concentrations of from 10 to 5000 parts per million may be used, for example. The present compounds may be applied to the foliage of infected plants as an emulsion spray, formulated as described above, e. g.

| | Parts |
|---|---|
| Petroleum oil | 9 |
| Water | 989 |
| Wetting agent | 1 |
| Toxicant | 1 |

In addition to application to plants for the prevention or control of disease, the present compounds may also be applied, for example, to fabric, wood, and other materials susceptible to fungicidal attack.

An additional field of biological toxicity in which the effectiveness of the present compounds has been demonstrated is nematocidal activity. The effect of a nematocide can be estimated by counting the rate at which the nematodes flex their bodies when suspended in water. The motility of nematodes was reduced 50 percent as compared to a control, for example, by an 0.1 percent concentration of the acetone acetal of 1,4,5,6,7,7-hexachlorobicyclo[2.2.1]-5-heptene-2,3-diol, in 24 hours exposure. In a similar test, the 1,4,5,6,7,7-hexachlorobicyclo[2.2.1]-5-heptene-2,3-diol diacetate of Example 4 reduced the motility of the nematodes 75 percent in 24 hours at an 0.1 percent concentration.

The above examples indicate the widespread biological toxicity spectrum of the present compounds. The activities of the different compounds vary in different applications, naturally, and they will be applied in concentrations and applications suitably according to their activities.

While the invention has been described herein with particular reference to various preferred embodiments thereof, and examples have been given of suitable proportions and conditions, it will be appreciated that variations from the details given herein can be made without departing from the invention.

What is claimed is:
1. A compound of the formula

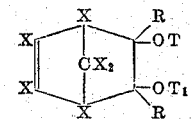

where X is a halogen having an atomic weight of below 100, R is selected from the class consisting of hydrogen and hydrocarbon radicals of from 1 to 6 carbon atoms, T and $T_1$ taken separately are selected from the class consisting of hydrogen, hydrocarboncarbonyl radicals wherein the hydrocarbon portions of the said hydrocarbon-substituted radicals are hydrocarbon radicals containing from 1 to 18 carbon atoms and from 0 to 2 carbocyclic rings containing up to 6 carbon atoms per ring, and hydrocarboncarbamyl radicals, and T and $T_1$ taken together represent the bivalent disubstituted carbon atom-containing radical

where Q taken separately is a hydrocarbon radical free of aliphatic unsaturation and containing up to 6 carbon atoms, Q' taken separately is selected from the class consisting of hydrogen and Q, and Q and Q' taken together represent a chain of up to 5 carbon atoms, the terminal carbon atoms of which are singly bonded to the carbon atom to which Q and Q' are attached, wherein the carbon atoms of the said chain of carbon atoms are attached to substituents selected from the class consisting of hydrogen, chlorine and lower alkyl radicals.

2. A diol of the formula

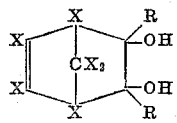

where X is a halogen having an atomic weight of below 100 and R is selected from the class consisting of hydrogen and hydrocarbon radicals of from 1 to 6 carbon atoms.

3. A carboxylic acid ester of the formula

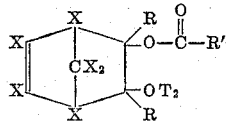

where X is a halogen having an atomic weight of below 100, R is selected from the class consisting of hydrogen and hydrocarbon radicals of from 1 to 6 carbon atoms, R' is a hydrocarbon radical containing from 1 to 18 carbon atoms and from 0 to 2 carbocyclic rings containing up to 6 carbon atoms per ring and $T_2$ is selected from the class consisting of hydrogen and hydrocarboncarbonyl radicals of the formula

where R' is as defined hereinabove.

4. A carbamic acid ester of the formula

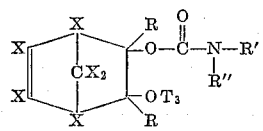

where X is a halogen having an atomic weight of below 100, R is selected from the class consisting of hydrogen and hydrocarbon radicals of from 1 to 6 carbon atoms, R' is a hydrocarbon radical containing from 1 to 18 carbon atoms and from 0 to 2 carbocyclic rings containing up to 6 carbon atoms per ring, R'' is selected from the class consisting of hydrogen and R', and $T_3$ is selected from the class consisting of hydrogen and hydrocarboncarbamyl radicals of the formula

where R' and R'' are as defined hereinabove.

5. An acetal of the formula

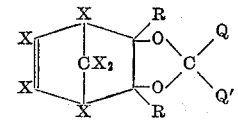

where X is a halogen having an atomic weight of below 100, R is selected from the class consisting of hydrogen and hydrocarbon radicals of from 1 to 6 carbon atoms, Q taken separately is a hydrocarbon radical free of aliphatic unsaturation and containing up to 6 carbon atoms, Q' taken separately is selected from the class consisting of hydrogen and Q, and Q and Q' taken together represent a chain of up to 5 carbon atoms, the terminal carbon atoms of which are singly bonded to the carbon atom to which Q and Q' are attached, wherein the carbon atoms of the said chain of carbon atoms are attached to substituents selected from the class consisting of hydrogen, chlorine and lower alkyl radicals.

6. 1,4,5,6,7,7 - hexachlorobicyclo[2.2.1] - 5 - heptene-2,3-diol.

7. 1,4,5,6,7,7 - hexachlorobicyclo[2.2.1] - 5 - heptene-2,3-diol diacetate.

8. 1,4,5,6,7,7 - hexachlorobicyclo[2.2.1] - 5 - heptene-2,3-diol dicarbanilate.

9. 1,4,5,6,7,7 - hexachlorobicyclo[2.2.1] - 5 - heptene-2,3-diol monocarbanilate.

10. The acetone acetal of 1,4,5,6,7,7-hexachlorobicyclo[2.2.1]-5-heptene-2,3-diol.

11. The method which comprises contacting a cyclic carbonate of the formula

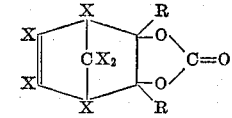

where X is a halogen having an atomic weight of below 100 and R is selected from the class consisting of hydrogen and hydrocarbon radicals of from 1 to 6 carbon atoms with an acidic hydrolysis catalyst, isolating from the reaction product a 1,4,5,6,7,7-hexahalobicyclo[2.2.1]-5-heptene-2,3-diol, contacting said diol with a carbonylic compound selected from the class consisting of carboxylic acid anhydrides, carboxylic acid halides, isocyanates, carbamyl halides, aldehydes, and ketones, and isolating from the reaction product a compound of the formula

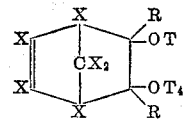

where X and R are as hereinbefore defined, T taken separately is selected from the class consisting of hydrogen and $T_4$, $T_4$ taken separately is selected from the class consisting of hydrocarboncarbonyl and hydrocarboncarbamyl radicals wherein the hydrocarbon portions of the said hydrocarboncarbonyl and hydrocarboncarbamyl radicals are hydrocarbon radicals containing from 1 to 18 carbon atoms and from 0 to 2 carbocyclic rings containing up to 6 carbon atoms per ring, and T and $T_4$ taken together represent a bivalent disubstituted carbon atom-containing radical

where Q taken separately is a hydrocarbon radical free of aliphatic unsaturation and containing up to 6 carbon atoms, Q' taken separately is selected from the class consisting of hydrogen and Q, and Q and Q' taken together represent a chain of up to 5 carbon atoms, the terminal carbon atoms of which are singly bonded to the carbon atom to which Q and Q' are attached, wherein the carbon atoms of the said chain of carbon atoms are attached to substituents selected from the class consisting of hydrogen, chlorine and lower alkyl radicals.

12. The method which comprises contacting a cyclic carbonate of the formula

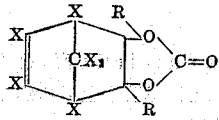

where X is a halogen having an atomic weight of below 100 and R is selected from the class consisting of hydrogen and hydrocarbon radicals of from 1 to 6 carbon atoms, with an acidic hydrolysis catalyst, and isolating from the reaction product a 1,4,5,6,7,7-hexahalobicyclo[2.2.1]-5-heptene-2,3-diol.

13. The method which comprises contacting a 1,4,5,6,7,7-hexahalobicyclo[2.2.1]-5-heptene-2,3-diol with a carbonylic compound selected from the class consisting of carboxylic acid anhydrides and carboxylic acid halides and isolating from the reaction product a carboxylic acid ester of the formula

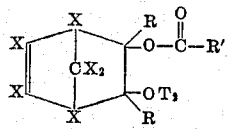

where X is a halogen having an atomic weight of below 100, R is selected from the class consisting of hydrogen and hydrocarbon radicals of from 1 to 6 carbon atoms, R' is a hydrocarbon radical containing from 1 to 18 carbon atoms and from 0 to 2 carbocyclic rings containing up to 6 carbon atoms per ring and $T_2$ is selected from the class consisting of hydrogen and hydrocarboncarbonyl radicals of the formula

wherein R' is as defined hereinabove.

14. The method which comprises contacting a 1,4,5,6,7,7-hexahalobicyclo[2.2.1]-5-heptene-2,3-diol with a carbonylic compound selected from the class consisting of hydrocarbon isocyanates and dihydrocarboncarbamyl halides and isolating from the reaction product a carbamic acid ester of the formula

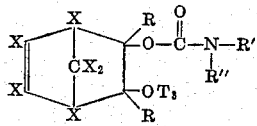

where X is a halogen having an atomic weight of below 100, R is selected from the class consisting of hydrogen and hydrocarbon radicals of from 1 to 6 carbon atoms, R' is a hydrocarbon radical containing from 1 to 18 carbon atoms and from 0 to 2 carbocyclic rings containing up to 6 carbon atoms per ring, R" is selected from the class consisting of hydrogen and R', and $T_3$ is selected from the class consisting of hydrogen and hydrocarboncarbamyl radicals of the formula

where R' and R" are as defined hereinabove.

15. The method which comprises contacting a 1,4,5,6,7,7-hexahalobicyclo[2.2.1]-5-heptene-2,3-diol with a carbonylic compound selected from the class consisting of aldehydes and ketones, and isolating from the reaction product an acetal of the formula

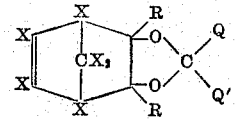

where X is a halogen having an atomic weight of below 100, R is selected from the class consisting of hydrogen and hydrocarbon radicals of from 1 to 6 carbon atoms, Q taken separately is a hydrocarbon radical free of aliphatic unsaturation and containing up to 6 carbon atoms, Q' taken separately is selected from the class consisting of hydrogen and Q, and Q and Q' taken together represent a chain of up to 5 carbon atoms, the terminal carbon atoms of which are singly bonded to the carbon atom to which Q and Q' are attached, wherein the carbon atoms of the chain of carbon atoms are attached to substituents selected from the class consisting of hydrogen, chlorine and lower alkyl radicals.

16. The method which comprises contacting 1,4,5,6,7,7-hexachlorobicyclo[2.2.1] - 5 - heptene - 2,3 - diol cyclic carbonate with aqueous hydrochloric acid, isolating from the reaction product 1,4,5,6,7,7 - hexachlorobicyclo[2.2.1]-5-heptene-2,3-diol, contacting the said diol with phenyl isocyanate, and isolating from the reaction product 1,4,5,6,7,7 - hexachlorobicyclo[2.2.1] - 5 - heptene-2,3-diol monocarbanilate.

17. The method which comprises contacting 1,4,5,6,7,7-hexachlorobicyclo[2.2.1]-5-heptene - 2,3-diol cyclic carbonate with aqueous hydrochloric acid and isolating 1,4,5,6,7,7-hexachlorobicyclo[2.2.1]-5-heptene-2,3-diol.

18. The method which comprises heating 1,4,5,6,7,7-hexachlorobicyclo[2.2.1] - 5 - heptene - 2,3 - diol with acetic anhydride and isolating from the reaction product 1,4,5,6,7,7 - hexachlorobicyclo - [2.2.1] - 5 - heptene-2,3-diol diacetate.

19. The method which comprises contacting 1,4,5,6,7,7-hexachlorobicyclo[2.2.1] - 5 - heptene - 2,3 - diol with phenyl isocyanate and isolating from the reaction product a compound selected from the group consisting of 1,4,5,6,7,7 - hexachlorobicyclo[2.2.1] - 5 - heptene-2,3-diol dicarbanilate and 1,4,5,6,7,7 - hexachlorobicyclo-[2.2.1]-5-heptene-2,3-diol monocarbanilate.

20. The method which comprises heating 1,4,5,6,7,7-hexachlorobicyclo[2.2.1]-5-heptene-2,3-diol with acetone and isolating from the reaction product the acetone acetal of 1,4,5,6,7,7 - hexachlorobicyclo[2.2.1] - 5 - heptene-2,3-diol.

21. A biological toxicant comprising an inert carrier, and, as the essential effective ingredient a compound of the formula

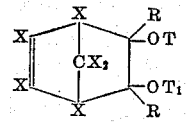

where X is a halogen having an atomic weight of below 100, R is selected from the class consisting of hydrogen and hydrocarbon radicals of from 1 to 6 carbon atoms, T and $T_1$ taken separately are selected from the class consisting of hydrogen, hydrocarboncarbonyl radicals wherein the hydrocarbon portions of the said hydrocarboncarbonyl and hydrocarboncarbamyl radicals contain from 1 to 18 carbon atoms and from 0 to 2 carbocyclic rings containing up to 6 carbon atoms per ring, and hydrocarboncarbamyl radicals, and T and $T_1$ taken together represent the bivalent disubstituted carbon atom-containing radical

where Q taken separately is a hydrocarbon radical free of aliphatic unsaturation and containing up to 6 carbon atoms, Q' taken separately is selected from the class consisting of hydrogen and Q, and Q and Q' taken together represent a chain of up to 5 carbon atoms, the terminal carbon atoms of which are singly bonded to the carbon atom to which Q and Q' are attached, wherein the carbon atoms of the said chain of carbon atoms are attached to substituents selected from the class consisting of hydrogen, chlorine and lower alkyl radicals.

22. A herbicidal composition comprising an inert carrier and, as the essential effective ingredient, a diol of the formula

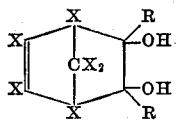

where X is a halogen having an atomic weight of below 100 and R is selected from the group consisting of hydrogen and hydrocarbon radicals of from 1 to 6 carbon atoms.

23. A herbicidal composition comprising an oil-in-water emulsion of 1,4,5,6,7,7 - hexachlorobicyclo-[2.2.1]-5-heptene-2,3-diol.

24. The method of destroying vegetation which comprises applying to living plants a phytotoxic amount of a herbicidal composition comprising an inert carrier and, as the essential effective ingredient, 1,4,5,6,7,7-hexachlorobicyclo[2.2.1]-5-heptene-2,3-diol.

25. A fungicidal composition comprising an inert carrier and, as the essential effective ingredient, 1,4,5,6,7,7-hexachlorobicyclo[2.2.1] - 5 - heptene - 2,3 - diol monocarbanilate.

26. The method of killing fungi which comprises exposing said fungi to a toxic quantity of 1,4,5,6,7,7-hexachlorobicyclo[2.2.1] - 5 - heptene - 2,3 - diol monocarbanilate.

References Cited in the file of this patent
UNITED STATES PATENTS

| | | |
|---|---|---|
| 2,351,311 | Alder | June 13, 1944 |
| 2,528,654 | Herzfeld et al. | Nov. 7, 1950 |
| 2,552,567 | McBee | May 15, 1951 |
| 2,606,910 | Herzfeld | Aug. 12, 1952 |
| 2,635,979 | Lidov | Apr. 21, 1953 |
| 2,697,103 | Ordas | Dec. 14, 1954 |
| 2,717,851 | Lidov | Sept. 13, 1955 |
| 2,736,730 | Kleiman | Feb. 28, 1956 |

OTHER REFERENCES

Palomaa et al.: Ber. Deut. Chem., vol. 72 (1939), page 313 (1 page).

UNITED STATES PATENT OFFICE
Certificate of Correction

July 1, 1958

Patent No. 2,841,485

William K. Johnson et al.

It is hereby certified that error appears in the printed specification of the above numbered patent requiring correction and that the said Letters Patent should read as corrected below.

Column 7, line 21, before the word "and" strike out "ice"; column 11, lines 36 to 40 inclusive, the formula should appear as shown below instead of as in the patent:

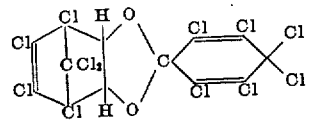

Signed and sealed this 23rd day of September 1958.

[SEAL]

Attest:
KARL H. AXLINE,
*Attesting Officer.*

ROBERT C. WATSON,
*Commissioner of Patents.*